United States Patent Office
2,972,787
Patented Feb. 28, 1961

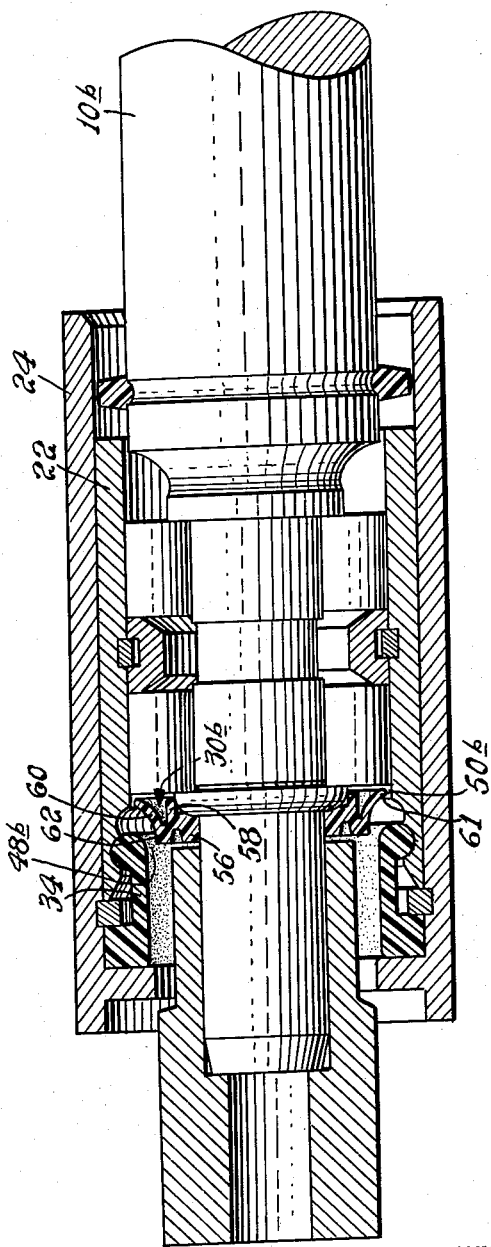

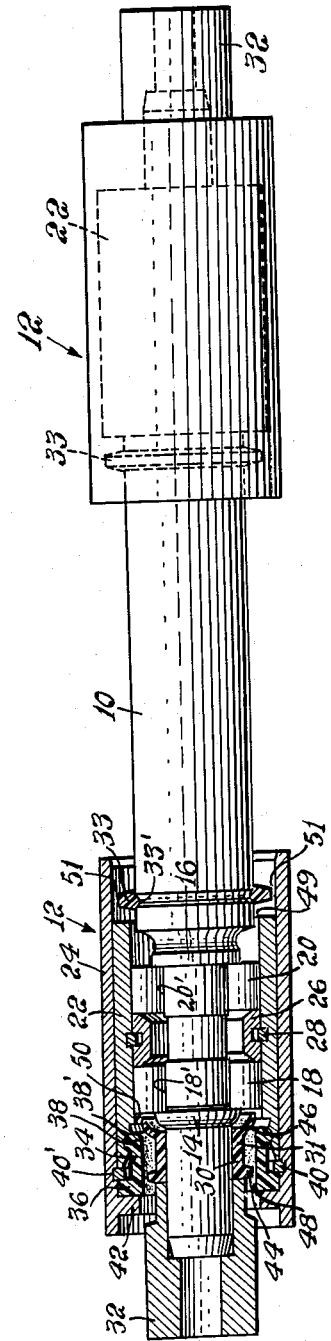

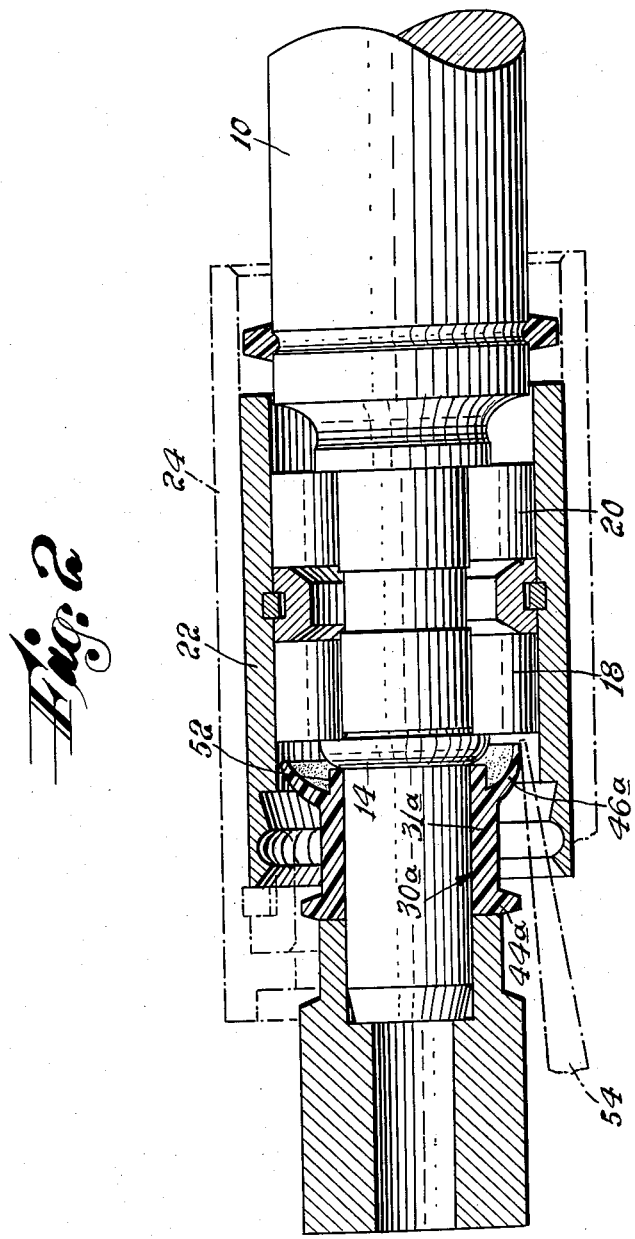

2,972,787

TOP ROLLER FOR SPINNING MACHINES

Walter Sommer, Leonberg, Wurttemberg, and Friedrich Schmidt, Stuttgart-Zuffenhausen, Germany, assignors to SKF Kugellagerfabriken Gesellschaft mit beschrankter Haftung, Stuttgart-Bad Cannstatt, Germany, a German company Filed Mar. 6, 1959, Ser. No. 797,772

9 Claims. (Cl. 19—142)

This invention relates to a top roller for spinning machines and, more particularly, to the kind of top roller, wherein a roll is mounted at each end of a shaft to be supported by an antifriction bearing and to rotate independently.

The primary object of the present invention is to generally improve the referred to kind of top roller.

It is known that in top rollers the risk is very great that dirt, fibers, and other foreign matter will penetrate through gaps between the shaft and rolls into the interior of the rolls and will reach the bearings. Fibers which have penetrated in this manner absorb the lubricant contained in the bearings and form a source of great inconvenience. Thus, it is another object of our invention to provide means to prevent fibers from reaching and collecting in the bearings.

At the same time, there must be provisions, on the one hand, for the lubrication of the bearings and, on the other, for the lubricant used to be prevented from escaping from the bearings. A further object of our present invention is to reconcile these two apparently contradictory requirements and to provide means which will allow easy lubrication but will also prevent the escape of lubricant.

Further objects of this invention center about a top roller construction which will be simple and inexpensive to manufacture, which includes strong bearings, makes easy mounting of packing means and easy lubrication of the bearings possible, and which will ensure a reliable sealing action of the packing means used.

Still further objects of our invention will become apparent from the following description.

The referred to objects of the invention and such other objects as will appear from the following description, as well as the advantages to be derived from the invention, are achieved by providing a top roller which comprises a shaft and a roll rotatably mounted at each end of the shaft. Each roll includes a tubular member and an outer sleeve fitted upon the tubular member, and is supported by an antifriction bearing. In the case of both bearings, the shaft constitutes the inner raceways, and the tubular members the outer raceways. A packing body is provided around the shaft on the side of each of the two shaft ends, the packing body being of resilient material and being shaped so as to help form a first and a second sealing gap. Both of these gaps which are outside of the respective bearing are spacedly arranged. The first sealing gap serves to prevent infiltration of fiber particles into the respective bearing, whereas the second sealing gap is provided to permit lubrication of the bearing and to serve at the same time to prevent the lubricant used from escaping from the bearing. On the side of the bearings, opposite to the shaft ends, there is, according to the invention, another pair of spacedly arranged sealing gaps, a third and a fourth sealing gap, the former serving to prevent the lubricant from escaping from the bearing, the latter preventing flying fiber particles and the like from infiltration into the bearings.

The specification is accompanied by a drawing in which:

Fig. 1 shows a top roller embodying features of our invention, one of the rolls being shown in an axial sectional view;

Fig. 2 is an axial sectional view of a modified roll, shown to enlarged scale, with some parts of the roll being shown in phantom; and Fig. 3 is a fragmentary sectional view of a further modification of a roll.

Referring to the drawing in greater detail, and initially to Fig. 1, journaled on each end of a shaft 10 is a roll generally designated 12. The shaft is machined out of a single piece and is provided, for each of the rolls, with two collars 14 and 16 and two raceways 18' and 20'. Each roll includes a tubular member 22 and an elastic cover or outer sleeve 24 fitted upon the tubular member, and is supported by a double-row roller bearing. The collars 14 and 16 serve as retainer rings for each of the antifriction bearings. The collar 14 provides contact with a series of rollers 18 and the collar 16 provides contact with a series of rollers 20. While the inner races of each of the bearings are formed by the shaft 10 itself, the outer races are constituted by the tubular member 22. The latter is maintained in coaxial alignment with the shaft by a spacer ring 26, and with the spacer ring by means of a spring ring 28.

Outside of each bearing on the side of the rollers 18, and laid around the shaft, there is a packing band 30 which is made of resilient material and is of such dimensions as to be held in place due to the elasticity of the material used. In the embodiment selected for illustration in Fig. 1, the packing band 30 appears clamped between the collar 14 and a member 32 pressed over a portion of the shaft at the respective shaft end. On the side of the rollers 20, and seated in an annular groove 33' in the shaft, is a packing ring 33 which, too, is made of resilient material and held in place by the elasticity of the material. The material for the packing band and packing ring must be resistant to the lubricants used. For instance, polyamide resins (nylons) were used satisfactorily.

A ring 34 made of resilient material, such as resilient plastics or spring steel, is provided to detachably connect the outer sleeve 24 to the tubular member 22. The connecting ring 34 is formed at one end with an annular flange 36 and at the other end with an annular bead 38. The outer sleeve 24 is provided with an angular groove 40' to receive a spring ring 40, and the flange 36 is clamped between the spring ring 40 and an inwardly directed flange 42 of the outer sleeve 24. With the flange 36 being tightly held between the spring ring 40 and the flange 42, and the bead 38 being seated in an anular groove 38' provided in the tubular member 22, the ring 34 connects the member 22 and sleeve 24. The ring 34 being of resilient material, the bead 38 is yieldable in radial direction if the outer sleeve 24 together with the ring 34 is pulled off the tubular member 22, that is, from the locked position, with the bead 38 in the groove 38', as shown in Fig. 1, into an unlocked position, not shown, with the bead 38 disengaged from the groove 38'. Conversely, if the outer sleeve together with the ring 34 is pushed over the member 22, the bead 38 will snap into the groove 38' as soon as the outer sleeve and tubular member are in their proper relative position.

The packing band 30 consists of a tubualr portion, a flange 44 of a trapezoidal cross section, provided at one end of the tubular portion, and a liplike flange 46 provided at the other end of the tubular portion. The flange 46 which may be differently shaped as well, for instance, like the blade of a knife, is directed radially away from the shaft toward the connecting ring 34. The lip curves away from the shaft toward the series of rollers 18. It will be seen that the flange 44 and ring 34 form a gap 48, while the lip 46 and the tubular member 22 form a gap 50. Viewed from the bearing, the gap 48 is an outer gap, and the gap 50 an inner gap. These two gaps which are spacedly arranged are sealing gaps. The gap 48 which will be referred to as the first gap serves to prevent infiltration of fibers into the bearing. The gap 50 which will be referred to as the second gap prevents the escape of lubricant from the bearing. However, due to the formation of the lip 46 and the material used therefor, it is possible to introduce the nozzle of an oiler into the gap 50 by deflecting the lip and widening the gap. The normal position of the lip, with the gap being narrow, is shown in solid lines, and the widened gap position of the lip is shown in dotted lines. Upon the withdrawal of the oiler nozzle, the lip 46 will return into its normal position.

On the side of the rollers 20, outside of the bearing, there are likewise two sealing gaps. A gap 49 is formed between the shaft 10 and the annular member 22, which gap is referred to as the third gap, and a gap 51 is formed between the packing ring 33 and the outer sleeve 24, the latter gap being referred to as the fourth gap. The gap 49 may be considered an inner gap as the gap 50 and is provided to prevent the escape of lubricant from the bearing, while the gap 51 may be regarded as an outer gap as the gap 48 and serves to prevent fiber particles from infiltrating into the bearing. The gaps 49 and 51 are spacedly arranged.

It will be clear that whenever a part is used to connect the tubular member 22 and outer sleeve 24, such as the ring 34 shown in Fig. 1, the connecting part may be differently constructed as well. Reference, in this connection, is made to the copending application Serial No. 542,214, filed on October 24, 1955, now Patent No. 2,861,-829, which discloses means of different constructions to detachably connect coaxial tubular members. The tubular members dealt with in said copending application just as the tubular members of the present construction are movable relative to each other in axial direction into a coupled position and out of this position into an uncoupled one. There are coupling means provided on the connecting part and at least on one of the tubular members, which are in engagement when the tubular members are in the coupled position, and which are yieldingly disengaged when the tubular members are uncoupled. From Fig. 1, it will be seen that the packing band 30 is formed so as to permit the bead 38 to deflect, in the case of disengagement from the groove 38', into the space between the flange 44 and the lip 46 of the band 30.

In the top roller partly illustrated in Fig. 2, all parts are the same as the corresponding parts of the top roller of Fig. 1, except that there is a difference between the part which has been referred to hereinbefore as the packing band and is designated 30 in Fig. 1 and the corresponding part in the construction of Fig. 2. In the latter construction, the packing band 30a comprises a tubular portion 31a, a flange 44a, a lip 46a, and a continuation 52. The difference in shape of the band 30a accounts for a difference in the relationship between the band and the neighboring parts. In the construction of Fig. 1, the lip 46, while in normal position, leans partly, and while deflected, to a greater extent or fully, against the collar 14. In the construction of Fig. 2, the lip 46a stands freely. In the embodiment shown in Fig. 1, it is the tubular portion 31 that appears to be held between the member 32 and the collar 14, whereas in the present case it is the free end of the tubular portion 31a and the continuation 52, which bears against the member 32 and collar 14, respectively.

Fig. 2 shows the introduction of a nozzle 54 of an oiler to reach the outer faces of the series of rollers 18. It will be apparent that in order to make the lubrication of the bearings possible, it is necessary to pull the outer sleeve 24 off the tubular member 22. The nozzle 54 is introduced between the flange 44a and the tubular member 22.

The construction of the invention permits the outer sleeve to be easily pulled off and to be just as easily pushed back.

In Fig. 3, the packing body which corresponds to the packing band 30 of Fig. 1, and packing band 30a of Fig. 2, is designated 30b. It is shown to have two legs 56 and 58 which rest on the shaft 10b and a tongue 60 the root of which, at 62, forms with the connecting ring 34 a gap 48b, and the tip 61 of which forms together with the tubular member 22 a gap 50b.

From Fig. 3, the manner will also be seen in which the bead 38 is radially bent inwardly when the outer sleeve 24 is drawn off the tubular member 22.

It is believed that the construction of the forms of top roller for practicing the invention, as shown, and the many advantages thereof will be clearly understood from the foregoing detailed description. Some of the advantages are reviewed hereinafter. The packing members are made of resilient material and need only be pushed in place to stay in place. There are two sealing gaps provided on each side of each bearing, the first and fourth gaps serving to prevent fly accumulations in the bearing, and the second and third gaps serving a twofold purpose. The latter gaps permit easy lubrication of the bearing and prevent lubricant from escaping from the bearing. The gaps are formed with the aid of resilient packing members, the use of which permits easy removal of the outer sleeve and a desirable temporary widening of the gap admitting lubricant. The first and second gaps, although spacedly arranged as the third and fourth gaps, are formed with the help of a single packing body. The latter is formed to fit tightly around the shaft and to help form the spaced first and second gaps.

It will be apparent that while we have shown and described our invention in a few forms only, many changes and modifications may be made without departing from the spirit of the invention defined in the following claims.

We claim:

1. A top roller for a spinning machine, comprising a shaft; a roll rotatably mounted at each end of the shaft, each roll including a tubular member and an outer sleeve fitted upon the tubular member; an anti-friction bearing for each of the rolls, the shaft constituting the inner raceways, and the tubular members constituting the outer raceways, of the bearings; and a packing body outside of each bearing, each packing body being provided around, and on the side of an end of the shaft, being of resilient material, and being shaped so as to help form a first and a second sealing gap, said gaps being spaced, the first gap serving to prevent infiltration of fiber particles into the associated bearing, the second gap permitting lubrication of the associated bearing and serving at the same time to prevent the lubricant used from escaping from the bearing, the shaft and each tubular member forming a third sealing gap serving to prevent lubricant from escaping from the bearing.

2. In a top roller according to claim 1, a packing ring provided around the shaft outside of each bearing on the side of the nonassociated roll, the packing ring being of resilient material and extending in a radially outward direction and helping form a fourth sealing gap serving to prevent flying fiber particles from infiltrating into the bearing.

3. In a top roller according to claim 2, said flange and packing ring being of substantially trapezoidal cross section.

4. In a top roller according to claim 2, both the packing body and packing ring being dimensioned so as to be held in place due to the elasticity of the material of said body and ring.

5. A top roller for a spinning machine, comprising a shaft; a roll rotatably mounted at each end of the shaft, each roll including a tubular member and an outer sleeve fitted upon the tubular member; an antifriction bearing for each of the rolls, the shaft constituting the inner raceways, and the tubular members constituting the outer raceways, of the bearings; a packing body outside of each bearing, each packing body being provided around, and on the side of an end of the shaft, being of resilient material, and being shaped so as to help form a first and a second sealing gap, each packing body including a substantially tubular portion, an annular flange at the outer end of said portion, when viewed from the associated bearing, an annular lip at the other end of said portion, and an extension of said portion on said other end thereof, the flange extending in a radially outward direction and helping form said first gap, the lip curving away from the tubular portion toward the associated bearing and helping form said second gap, said gaps being spaced, the first gap serving to prevent infiltration of fiber particles into the associated bearing, the second gap permitting lubrication of the associated bearing and serving at the same time to prevent the lubricant used from escaping from the bearing.

6. In a top roller according to claim 5, the shaft and each tubular member forming a third sealing gap, a packing ring provided around the shaft outside of each bearing on the side of the nonassociated roll, the packing ring being of resilient material and extending in a radially outward direction and helping form a fourth sealing gap, said third and fourth gaps being spacedly arranged.

7. A top roller for spinning machines, comprising a shaft, a roll rotatably mounted at each end of the shaft, each roll including a tubular member and an outer sleeve fitted upon the tubular member, a single antifriction bearing for each of the rolls, the shaft constituting the inner raceways, and the tubular members constituting the outer raceways, of the bearings, a packing body provided outside of each bearing around, and on the side of an end of, the shaft, the packing body including a substantially tubular portion and spacedly arranged annular flanges integrally formed with the tubular portion, the flanges helping form a first and a second sealing gap, the shaft and each tubular member forming a third sealing gap, a packing ring provided outside of each bearing around the shaft and on the side of the nonassociated roll, the packing ring extending in a radially outward direction and helping form a fourth sealing gap, the packing body and packing ring being of resilient material and being held in place by their own elasticity, the first and fourth sealing gaps serving to prevent infiltration of fiber particles into the associated bearing, the second and third sealing gaps permitting lubrication of the associated bearing and serving at the same time to prevent the lubricant used from escaping from the bearing.

8. In a top roller according to claim 7, one of said flanges being provided at the outer end of said tubular portion, when viewed from the associated bearing, and extending in a radially outward direction to help form said first gap, the other flange being constituted by a lip at the inner end of the tubular portion, the lip curving away from the tubular portion toward the associated bearing and helping form said second gap.

9. A top roller for a spinning machine, comprising a shaft; a roll rotatably mounted at each end of the shaft, each roll including a tubular member and an outer sleeve fitted upon the tubular member; a single antifriction bearing for each of the rolls, the shaft constituting the inner raceways, and the tubular members constituting the outer raceways of the bearings; a ring detachably connecting the tubular member and outer sleeve, the connecting ring being of resilient material and being provided with locking means, the tubular member and outer sleeve being provided with complementary locking means; a packing body outside of each bearing, each packing body being provided around, and on the side of an end of, the shaft, being of resilient material, and including a substantially tubular portion and two spacedly arranged annular flanges integrally formed with the tubular portion, said connecting ring together with one of said flanges forming a first sealing gap, and said tubular member together with the other one of said flanges forming a second sealing gap, said gaps being spaced, the first gap serving to prevent infiltration of fiber particles into the associated bearing, the second gap permitting lubrication of the associated bearing and serving at the same time to prevent the lubricant used from escaping from the bearing.

References Cited in the file of this patent

UNITED STATES PATENTS

| | | |
|---|---|---|
| 2,621,374 | Waite | Dec. 16, 1952 |
| 2,727,280 | Waite | Dec. 20, 1955 |
| 2,867,006 | Pray | Jan. 6, 1959 |
| 2,884,665 | Schlums | May 5, 1959 |
| 2,885,247 | Schlums | May 5, 1959 |
| 2,938,242 | Schiltknecht | May 31, 1960 |